(12) United States Patent
Spangler et al.

(10) Patent No.: US 11,131,212 B2
(45) Date of Patent: Sep. 28, 2021

(54) GAS TURBINE ENGINE COOLING COMPONENT

(71) Applicant: United Technologies Corporation, Farmington, CT (US)

(72) Inventors: Brandon W. Spangler, Vernon, CT (US); Adam P. Generale, Dobbs Ferry, NY (US); Ky H. Vu, East Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 584 days.

(21) Appl. No.: 15/832,925

(22) Filed: Dec. 6, 2017

(65) Prior Publication Data

US 2019/0170014 A1    Jun. 6, 2019

(51) Int. Cl.
| | |
|---|---|
| *F01D 5/14* | (2006.01) |
| *F01D 25/12* | (2006.01) |
| *F01D 9/04* | (2006.01) |
| *F01D 5/18* | (2006.01) |

(52) U.S. Cl.
CPC .............. *F01D 25/12* (2013.01); *F01D 5/147* (2013.01); *F01D 5/188* (2013.01); *F01D 9/041* (2013.01); *F05D 2220/323* (2013.01); *F05D 2240/122* (2013.01); *F05D 2240/81* (2013.01); *F05D 2250/185* (2013.01); *F05D 2260/201* (2013.01)

(58) Field of Classification Search
CPC ........ F01D 25/12; F01D 25/14; F01D 25/145; F01D 25/00; F01D 25/08; F01D 25/24; F01D 9/041; F01D 5/147; F01D 5/188
USPC ........................................................ 415/115
See application file for complete search history.

(56) References Cited

U.S. PATENT DOCUMENTS

| | | | |
|---|---|---|---|
| 3,628,880 | A | 12/1971 | Smuland et al. |
| 4,721,433 | A | 1/1988 | Piendel et al. |
| 6,142,730 | A | 11/2000 | Tomita et al. |
| 8,292,573 | B2 | 10/2012 | Broomer et al. |
| 8,702,375 | B1 | 4/2014 | Liang |
| 8,821,111 | B2 | 9/2014 | Gear et al. |
| 8,827,632 | B1 | 9/2014 | Lee et al. |

(Continued)

FOREIGN PATENT DOCUMENTS

| | | |
|---|---|---|
| EP | 1489265 | 12/2004 |
| EP | 2949871 | 2/2015 |

(Continued)

OTHER PUBLICATIONS

The Extended European Search Report for EP Application No. 18210771.4 dated Feb. 26, 2019.

(Continued)

*Primary Examiner* — David E Sosnowski
*Assistant Examiner* — Sabbir Hasan
(74) *Attorney, Agent, or Firm* — Carlson, Gaskey & Olds, P.C.

(57) ABSTRACT

A component for a gas turbine engine includes a platform that has a gas path side and a non-gas path side. At least one airfoil extends from the gas path side of the platform. At least one airfoil includes a serpentine cavity and a serpentine turn extends from the non-gas path side of the platform. A cover plate is located adjacent the non-gas path side of the platform. The cover plate includes a first plurality of fluid openings that extend through the cover plate. At least one bulge at least partially defines a fluid passageway with the serpentine turn.

21 Claims, 5 Drawing Sheets

(56) References Cited

U.S. PATENT DOCUMENTS

| | | |
|---|---|---|
| 8,870,524 B1 | 10/2014 | Liang |
| 2012/0148383 A1 | 6/2012 | Gear et al. |
| 2015/0159494 A1 | 6/2015 | Carrier et al. |
| 2016/0312632 A1 | 10/2016 | Hagan et al. |
| 2018/0045060 A1 | 2/2018 | Matsuo et al. |

FOREIGN PATENT DOCUMENTS

| | | |
|---|---|---|
| EP | 2921650 | 9/2015 |
| EP | 3232002 | 10/2017 |
| EP | 3361054 | 8/2018 |
| JP | 2003083001 | 3/2003 |

OTHER PUBLICATIONS

The Extended European Search Report for EP Application No. 18210702.9, dated Feb. 26, 2019.

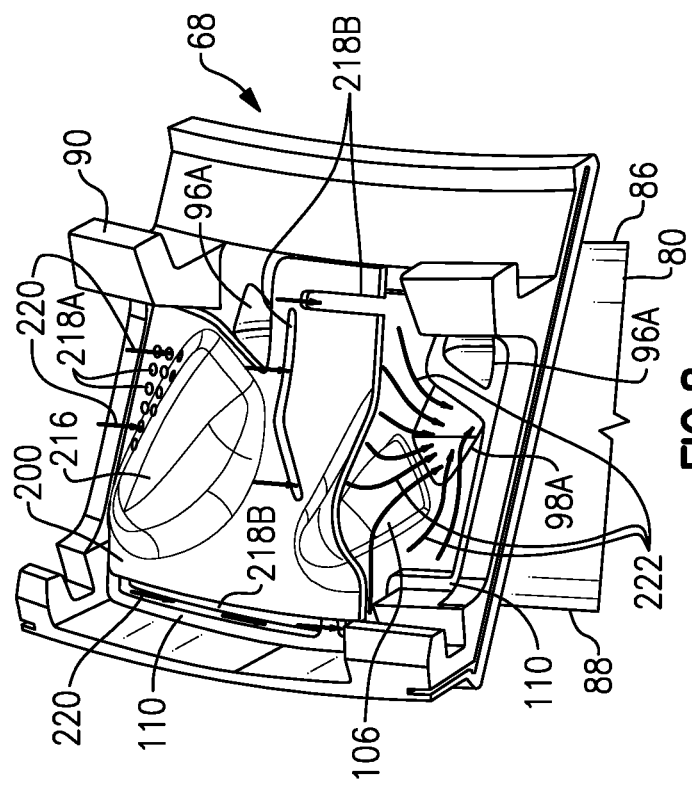
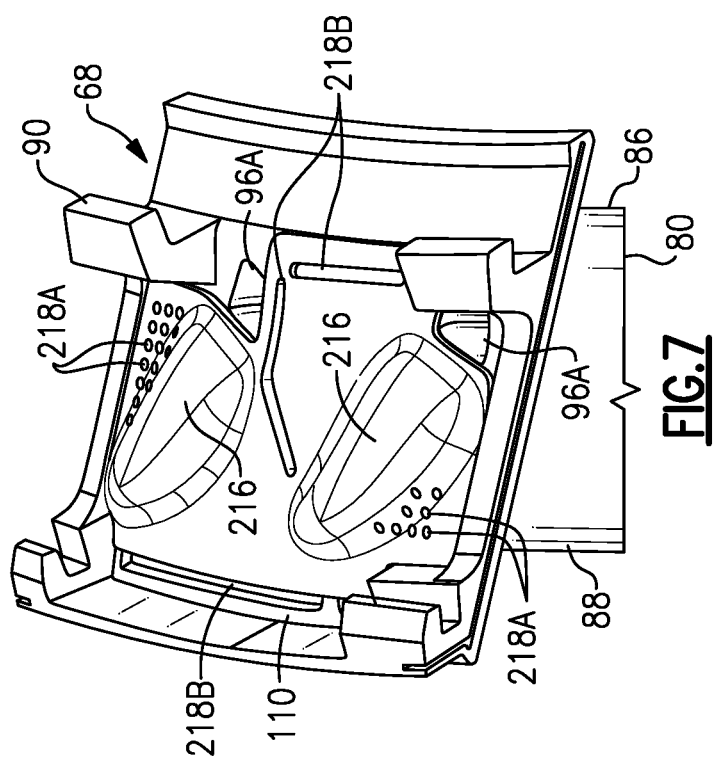

GAS TURBINE ENGINE COOLING COMPONENT

STATEMENT REGARDING FEDERALLY SPONSORED RESEARCH OR DEVELOPMENT

This invention was made with government support under Contract No. FA8626-16-C-2139, awarded by the Air Force. The Government has certain rights in this invention.

BACKGROUND

This disclosure relates generally to a gas turbine engine, and more particularly to a component that can be incorporated into a gas turbine engine. The component can include a cover plate for providing dedicated cooling to portions of the component.

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Both the compressor and turbine sections of a gas turbine engine may include alternating rows of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes prepare the airflow for the next set of blades. These blades and vanes are examples of components that may need to be cooled by a dedicated source of cooling air in order to withstand the relatively high temperatures of the hot combustion gases that are communicated along the core flow path of a gas turbine engine.

SUMMARY

In one exemplary embodiment, a component for a gas turbine engine includes a platform that has a gas path side and a non-gas path side. At least one airfoil extends from the gas path side of the platform. At least one airfoil includes a serpentine cavity and a serpentine turn extends from the non-gas path side of the platform. A cover plate is located adjacent the non-gas path side of the platform. The cover plate includes a first plurality of fluid openings that extend through the cover plate. At least one bulge at least partially defines a fluid passageway with the serpentine turn.

In a further embodiment of any of the above, a perimeter of the cover plate is attached to a land on the non-gas path side of the platform. At least one bulge is spaced inward from a perimeter of the cover plate.

In a further embodiment of any of the above, the non-gas path side of the platform includes a feed cavity surrounding an inlet to the serpentine cavity.

In a further embodiment of any of the above, the cover plate encloses the inlet to the serpentine feed cavity.

In a further embodiment of any of the above, at least one airfoil includes a cooling cavity forward of the serpentine cavity that has an inlet spaced from the cover plate.

In a further embodiment of any of the above, the cover plate includes a pair of airfoils that each have a corresponding serpentine turn on the non-gas path side of the platform. The cover plate includes a pair of bulges each aligned with one of the serpentine turns.

In a further embodiment of any of the above, the first plurality of fluid openings in the cover plate are located on a first circumferential side of at least one bulge. A second plurality of fluid openings are located on a second circumferential side of at least one bulge.

In a further embodiment of any of the above, the cover plate includes at least one elongated slot opening.

In a further embodiment of any of the above, the cover plate and the non-gas path side of the platform each at least partially define a fluid opening into a feed cavity in the non-gas path side of the platform.

In a further embodiment of any of the above, the cover plate is free of non-cooling apertures.

In a further embodiment of any of the above, the serpentine cavity feeds trailing edge cooling apertures on the at least one airfoil.

In another exemplary embodiment, a gas turbine engine includes a compressor section. A combustor section is in fluid communication with the compressor section. A turbine section is in fluid communication with the combustor section. One of the compressor section or the turbine section includes at least one component that has a platform that has a gas path side and a non-gas path side. At least one airfoil extends from the gas path side of the platform. At least one airfoil includes a serpentine cavity and a serpentine turn extends from the non-gas path side of the platform. A cover plate is located adjacent the non-gas path side of the platform. The cover plate includes a first plurality of fluid openings that extend through the cover plate. At least one bulge at least partially defines a fluid passageway with the serpentine turn.

In a further embodiment of any of the above, a perimeter of the cover plate is attached to a land on the non-gas path side of the platform and the at least one bulge is spaced inward from a perimeter of the cover plate.

In a further embodiment of any of the above, the non-gas path side of the platform includes a feed cavity that surrounds an inlet to the serpentine cavity.

In a further embodiment of any of the above, the cover plate encloses the inlet to the serpentine feed cavity.

In a further embodiment of any of the above, at least one airfoil includes a cooling cavity forward of the serpentine cavity that has an inlet spaced from the cover plate.

In a further embodiment of any of the above, the cover plate includes a pair of airfoils that each have a corresponding serpentine turn on the non-gas path side of the platform. The cover plate includes a pair of bulges each aligned with one of the serpentine turns.

In a further embodiment of any of the above, the first plurality of fluid openings in the cover plate are located on a first circumferential side of the at least one bulge. A second plurality of fluid openings are located on a second circumferential side of the at least one bulge.

In a further embodiment of any of the above, the cover plate includes at least one elongated slot opening and the serpentine cavity feeds trailing edge cooling apertures on the at least one airfoil.

In a further embodiment of any of the above, the cover plate and the non-gas path side of the platform each at least partially define a fluid opening into the feed cavity in the non-gas path side of the platform.

BRIEF DESCRIPTION OF THE DRAWINGS

FIG. 7 is a perspective end view of the example vane of FIG. 3 with another example cover plate.

FIG. 8 is a perspective end view of the example vane of FIG. 3 with the example cover plate of FIG. 7 in cross section.

DETAILED DESCRIPTION

Figure 1:
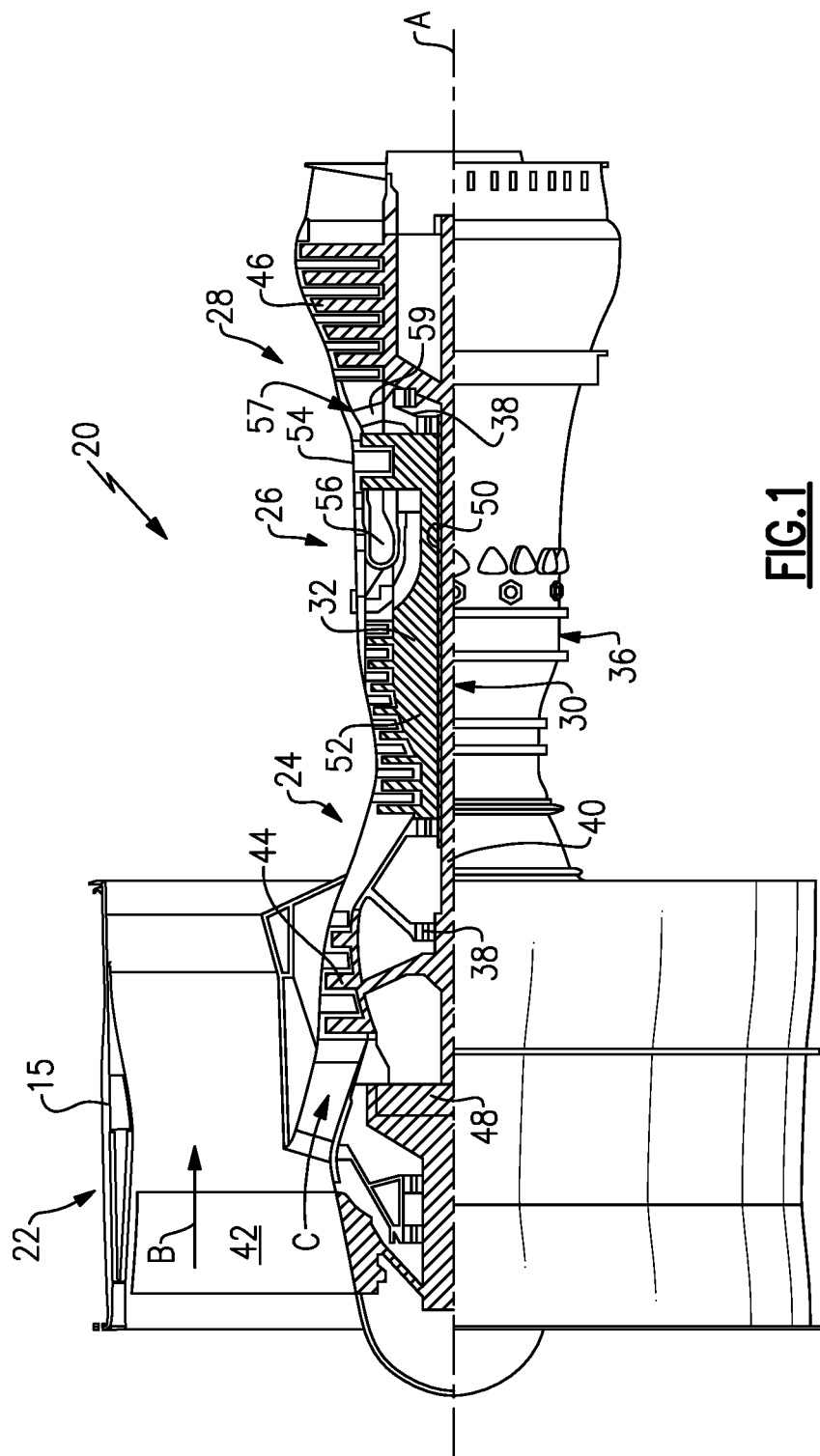
FIG. 1 is a schematic view of an example gas turbine engine according to a first non-limiting embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram °R)/(518.7°R)]^{0.5}$. The "Low corrected fan tip speed" as disclosed herein according to one non-limiting embodiment is less than about 1150 ft/second (350.5 meters/second).

Figure 2:
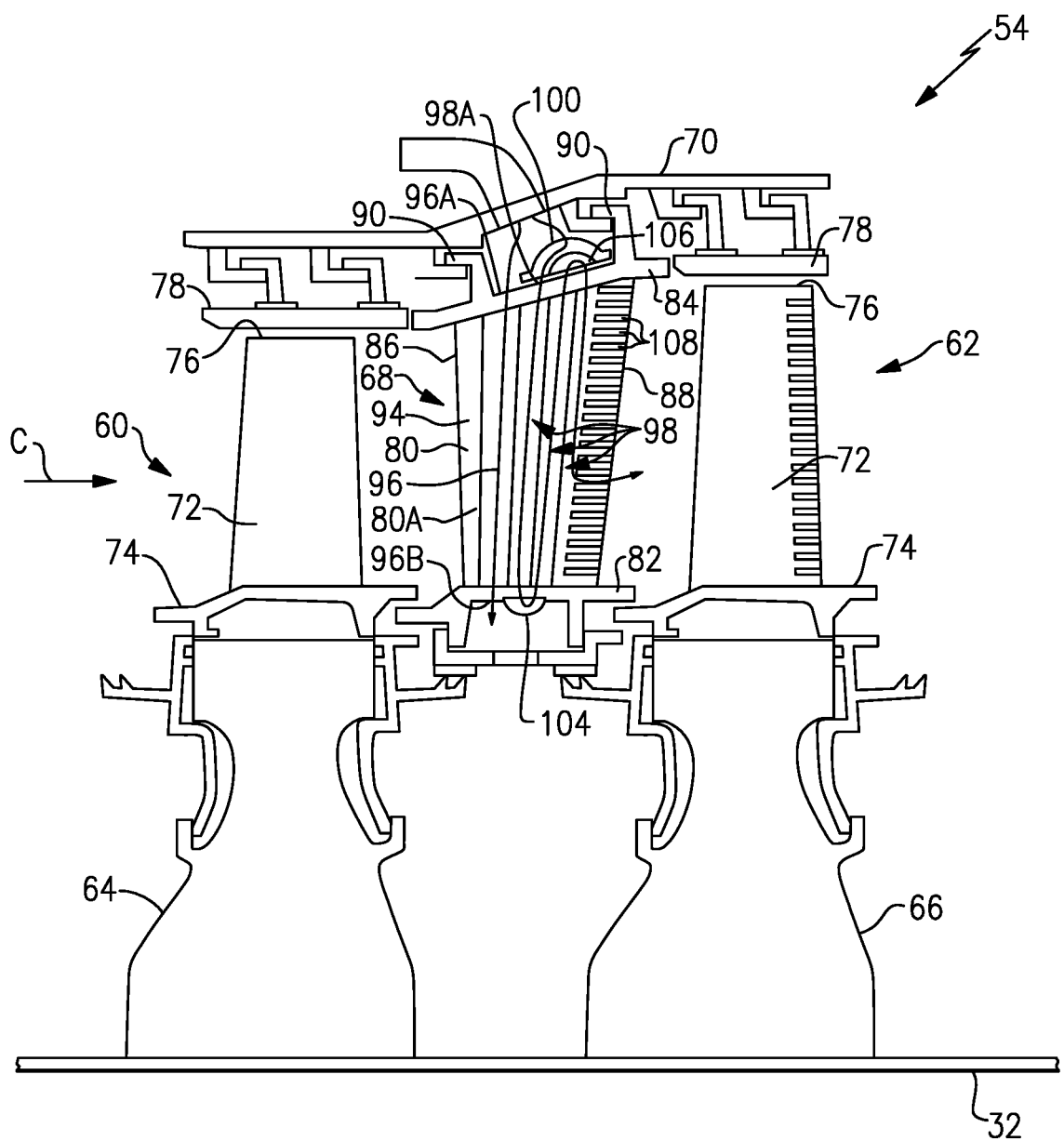
FIG. 2 is a schematic view of a section of the gas turbine engine of FIG. 1, such as a turbine section.

FIG. 2 illustrates a cross-sectional view through a high pressure turbine section 54. In the example high pressure turbine section 54, first and second arrays of rotating blades 60, 62 are axially spaced apart from one another around first and second rotor disks 64, 66, respectively. An array of vanes 68 are located axially between the first and second arrays of blades 60, 62. The first and second arrays of blades 60, 62 and the array of vanes 68 are spaced radially inward from a case structure 70. It should be understood that any number of stages may be used in the example high pressure turbine section 54. Moreover, the disclosed airfoils may be used in a compressor section or the turbine section.

Each blade in the first and second array of blades 60, 62 includes an airfoil 72 that extends from a platform 74 towards a free end at a blade tip 76. The blade tip 76 is located adjacent a blade outer air seal 78 that is supported by the case structure 70. The blade outer air seals 78 provide an outer boundary of the core flow path C and the platform 74 provides an inner boundary of the core flow path C. The first and second arrays of the blades 60, 62 are operatively connected to the high speed spool 32, for example.

The array of vanes 68 include individual vanes having airfoils 80 that extend between a radially inner platform 82 and a radially outer platform 84 that define the core flow path C. The airfoil 80 includes a pressure side 80A (predominantly concave—FIG. 2) and a suction side 80B (predominantly convex—FIG. 3) extending between a leading edge 86 and a trailing edge 88. The radially outer platform 84 includes hooks 90 that secure the array of vanes 68 relative to the case structure 70. It should be understood that the array of vanes 68 may be discrete from one another, arranged in integrated clusters of vanes, or a continuous ring of vanes.

Figure 3:
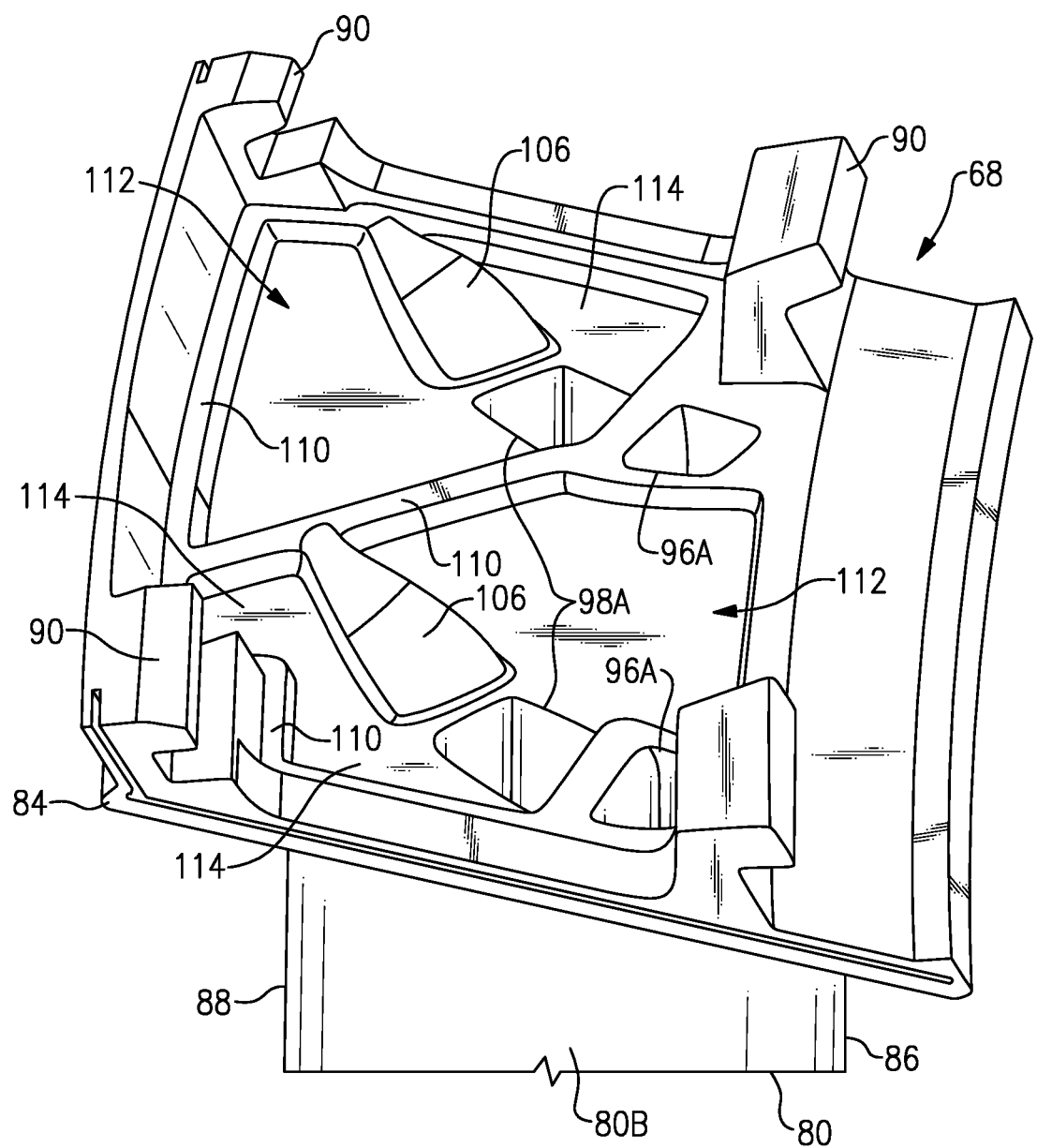
FIG. 3 is a perspective end view of an example vane.

Each airfoil 80 includes multiple internal cooling circuits. In the illustrated example, the airfoil 80 includes a leading edge cavity 94, an intermediate cavity 96, and a serpentine cavity 98. As shown in FIGS. 2 and 3, cooling air enters the intermediate cavity 96 through an intermediate cavity inlet 96A on a radially outer side of the radially outer platform 84 and travels in a radially inward direction through the airfoil 80 and exits through an intermediate cavity outlet 96B in a radially inner side of the radially inner platform 82. In this disclosure, radial or radially is in relation to the engine axis A unless stated or discussed otherwise.

Cooling air enters the serpentine cavity 98 by traveling through fluid inlets 118 in a cover plate 100 (FIGS. 4-6) and through a serpentine cavity inlet 98A in the radially outer side of the radially outer platform 84. The cooling air travels radially inward through the airfoil 80 until it reaches a radially inner serpentine turn 104 and is directed radially outward until it reaches a radially outer serpentine turn 106 and is redirected radially inward. The cooling air in the serpentine cavity 98 then exits the airfoil 80 through cooling apertures 108 (FIG. 2) along the trailing edge 88 of the airfoil 80.

In the illustrated example shown in FIG. 3, the array of vanes 68 are comprised of vane doublets having two airfoils 80. The radially outer platform 84 includes the two intermediate cavity inlets 96A to each of the intermediate cavities 96 in each of the airfoils 80 and two serpentine cavity inlets 98A to each of the serpentine cavities 98 in each of the airfoils 80.

A radially outer side or non-gas path side of the radially outer platform 84 includes a cover plate contact surface 110. In the illustrated example, the cover plate contact surface 110 is located on a radially outer surface of a rib that forms a weld land surrounding a recessed cavity 112. The radially outer serpentine turn 106 protrudes radially outward from a base surface 114 of the recessed cavity 112. The radially outer serpentine turn 106 includes one edge adjacent a downstream edge of the serpentine cavity inlet 98A. An upstream edge of the serpentine cavity inlet 98A is located adjacent the rib forming the cover plate contact surface 110. In the illustrated example, each of the recessed cavities 112 are separated from each other by the rib defining cover plate contact surface 110.

In the illustrated example, the intermediate cavity inlet 96A is radially aligned with and at least partially defined by the cover plate contact surface 110. The serpentine cavity inlet 98A is spaced radially inward from the intermediate cavity inlet 96A and at least partially defined by the base surface 114 of the recessed cavity 112.

Figure 4:
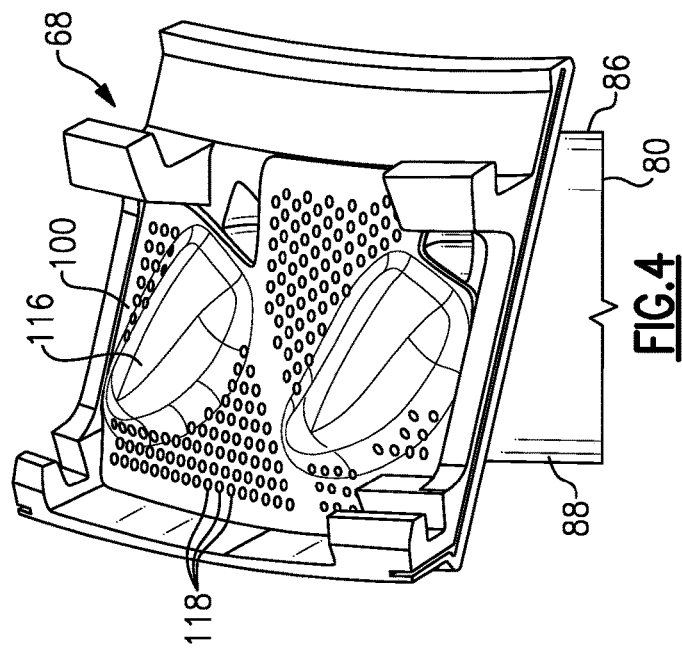
FIG. 4 is a perspective end view of the example vane of FIG. 3 with an example cover plate.
Figure 5:
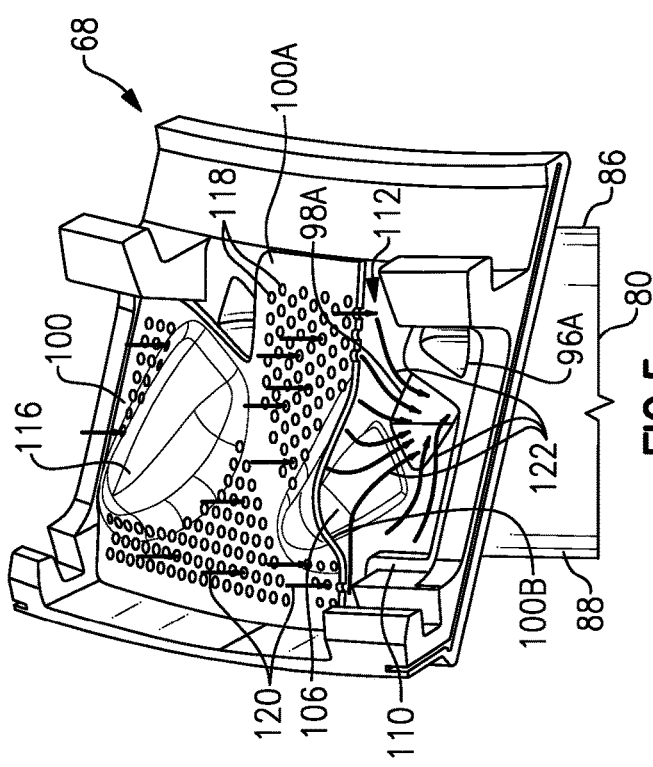
FIG. 5 is a perspective end view of the example vane of FIG. 3 with the example cover plate of FIG. 4 in cross section.
Figure 6:
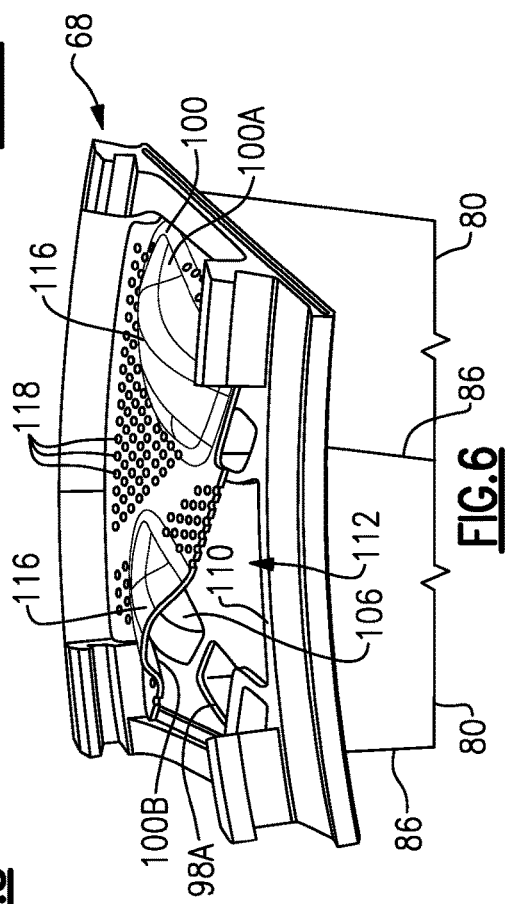
FIG. 6 is another perspective end view of the example vane of FIG. 3 with the example cover plate of FIG. 4 in cross section.

As shown in FIGS. 4-6, the cover plate 100 encloses the recessed cavity 112 to define a feed cavity for the serpentine cavity inlet 98A. The cover plate 100 includes a radially outer side 100A and a radially inner side 100B. The radially inner side 100B is attached to cover plate contact surface 110 by welding, adhesive, or other means known in the art. The cover plate 100 is generally planar and includes bulges 116 circumferentially and axially aligned with the radially outer serpentine turns 106 and spaced radially outward from the radially outer serpentine turns 106 to define a fluid passageway there between.

As shown in FIG. 5, the cover plate 100 includes multiple fluid inlets 118 extending through the cover plate 100 to allow the cooling airflow to pass through the cover plate 100 as shown by arrows 120. In the illustrated example, the bulges 116 do not include the fluid inlets 118 and in another example, the bulges 116 includes some of the fluid inlets 118. Once the cooling air has passed through the fluid inlets 118 in the cover plate 100, the cooling air collects in the recessed cavity 112.

From the recessed cavity 112, the cooling air enters the serpentine cavity inlet 98A. Because the cover plate 100 includes bulges 116 adjacent to, but not contacting, the radially outer serpentine turns 106, the cooling air can travel over the radially outer serpentine turn 106 and enter the serpentine cavity inlet 98A. Because the cooling air can travel between the radially outer serpentine turn 106 and the cover plate 100, the cooling air can enter from three sides of the four sided serpentine cavity inlet 98A as shown by arrows 122 in FIG. 5, resulting in lower Mach numbers and pressure loss entering the serpentine cavity inlet 98A.

FIGS. 7 and 8 illustrate another example cover plate 200 located on the vane 68. The cover plate 200 is similar to the cover plate 100 except where shown in the Figures or described below. Like numbers will be used between the cover plates 100, 200 to show similar or identical elements.

The cover plate 200 includes multiple fluid inlets 218A located adjacent circumferential edges of the cover plate 200 and multiple fluid inlet slots 218B. In the illustrated example, the fluid inlet slots 218B are located at least partially between bulges 216 and/or adjacent axial ends of the cover plate 200. One of the fluid inlet slots is located adjacent an axially forward end of the cover plate 200 and is spaced from the axially forward end of the cover plate 200. Another of the fluid inlet slots 218B is located at an axially downstream edge of the cover plate 200 and is spaced from the cover plate contact surface 110. Another one of the fluid inlet slots 218B extends in a longitudinal direction through a mid-portion of the cover plate 200.

The cover plate 200 directs cooling air to the serpentine cavity inlet 98A in a similar fashion as the cover plate 100. Cooling air passes through the cover plate through the fluid inlets and slots 218A, 218B as shown by arrows 220 in FIG. 8. From the recessed cavity 112, the cooling air enters the serpentine cavity inlet 98A by traveling around or over the radially outer serpentine return 106 as shown by arrows 222.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:
1. A component for a gas turbine engine comprising:
a platform having a gas path side and a non-gas path side;

at least one airfoil extending from the gas path side of the platform, wherein the at least one airfoil includes a serpentine cavity and a serpentine turn extends from the non-gas path side of the platform; and a cover plate located adjacent the non-gas path side of the platform, the cover plate including:
a first plurality of fluid openings extending through the cover plate; and
at least one bulge at least partially defining a fluid passageway with the serpentine turn.

2. The gas turbine engine component of claim 1, wherein a perimeter of the cover plate is attached to a land on the non-gas path side of the platform and the at least one bulge is spaced inward from a perimeter of the cover plate.

3. The gas turbine engine component of claim 1, wherein the non-gas path side of the platform includes a feed cavity surrounding an inlet to the serpentine cavity and the feed cavity is defined between the platform and the cover plate.

4. The gas turbine engine component of claim 3, wherein the cover plate encloses the inlet to the serpentine feed cavity.

5. The gas turbine engine component of claim 4, wherein the at least one airfoil includes a cooling cavity forward of the serpentine cavity having an inlet and the cover plate includes a perimeter partially circumscribing the inlet to the cooling cavity forward of the serpentine cavity.

6. The gas turbine engine component of claim 1, wherein the component includes a pair of airfoils each having a corresponding serpentine turn on the non-gas path side of the platform and the cover plate includes a pair of bulges each aligned with one of the serpentine turns.

7. The gas turbine engine component of claim 6, wherein the first plurality of fluid openings in the cover plate are located on a first circumferential side of the at least one bulge and a second plurality of fluid openings are located on a second circumferential side of the at least one bulge.

8. The gas turbine engine component of claim 1, wherein the cover plate includes at least one elongated slot opening and the at least one elongated slot opening includes a dimension extending in an axial direction greater than a dimension extending in a circumferential direction.

9. The gas turbine engine component of claim 8, wherein the cover plate and the non-gas path side of the platform each at least partially define a fluid opening into a feed cavity in the non-gas path side of the platform.

10. The gas turbine engine component of claim 1, wherein the cover plate is free of non-cooling apertures.

11. The gas turbine engine component of claim 1, wherein the serpentine cavity feeds trailing edge cooling apertures on the at least one airfoil.

12. A gas turbine engine, comprising:
a compressor section;
a combustor section in fluid communication with said compressor section;
a turbine section in fluid communication with said combustor section; and
wherein one of the compressor section or the turbine section includes at least one component having
a platform having a gas path side and a non-gas path side;
at least one airfoil extending from the gas path side of the platform, wherein the at least one airfoil includes a serpentine cavity and a serpentine turn extends from the non-gas path side of the platform; and
a cover plate located adjacent the non-gas path side of the platform, the cover plate including:
a first plurality of fluid openings extending through the cover plate; and
at least one bulge at least partially defining a fluid passageway with the serpentine turn.

13. The gas turbine engine of claim 12, wherein a perimeter of the cover plate is attached to a land on the non-gas path side of the platform and the at least one bulge is spaced inward from a perimeter of the cover plate.

14. The gas turbine engine of claim 12, wherein the non-gas path side of the platform includes a feed cavity surrounding an inlet to the serpentine cavity and the feed cavity is defined between the platform and the cover plate.

15. The gas turbine engine of claim 14, wherein the cover plate encloses the inlet to the serpentine feed cavity.

16. The gas turbine engine of claim 15, wherein the at least one airfoil includes a cooling cavity forward of the serpentine cavity having an inlet and the cover plate includes a perimeter partially circumscribing the inlet to the cooling cavity forward of the serpentine cavity.

17. The gas turbine engine of claim 12, wherein the component includes a pair of airfoils each having a corresponding serpentine turn on the non-gas path side of the platform and the cover plate includes a pair of bulges each aligned with one of the serpentine turns.

18. The gas turbine engine of claim 17, wherein the first plurality of fluid openings in the cover plate are located on a first circumferential side of the at least one bulge and a second plurality of fluid openings are located on a second circumferential side of the at least one bulge.

19. The gas turbine engine of claim 12, wherein the cover plate includes at least one elongated slot opening and the serpentine cavity feeds trailing edge cooling apertures on the at least one airfoil and the at least one elongated slot opening includes a dimension extending in an axial direction greater than a dimension extending in a circumferential direction.

20. The gas turbine engine of claim 19, wherein the cover plate and the non-gas path side of the platform each at least partially define a fluid opening into the feed cavity in the non-gas path side of the platform.

21. The gas turbine engine of claim 1, wherein the at least one bulge in the cover plate is axially aligned with the serpentine turn and radially spaced from the serpentine turn and the fluid passageway extends along an entire exterior surface of the serpentine turn.

* * * * *